United States Patent [19]

Nilsson, Sr.

[11] 4,449,515
[45] May 22, 1984

[54] APPARATUS FOR COLLECTING, INTENSIFYING AND STORING SOLAR ENERGY

[75] Inventor: Jack E. Nilsson, Sr., Easley, S.C.

[73] Assignee: Seige Corporation, Greenville, S.C.

[21] Appl. No.: 425,071

[22] PCT Filed: Mar. 9, 1981

[86] PCT No.: PCT/US81/00293

§ 371 Date: Jul. 9, 1982

§ 102(e) Date: Jul 9, 1982

Related U.S. Application Data

[63] Continuation-in-part of Ser. No. 57,733, Jul. 16, 1979, Pat. No. 4,280,482.

[51] Int. Cl.³ ............................................. F24J 3/02
[52] U.S. Cl. .................................. 126/430; 126/435; 126/436; 126/438; 126/440; 126/901; 60/641.15
[58] Field of Search ............... 126/438, 430, 440, 439, 126/452, 451, 436, 435, 901, 417, 419, 449; 60/641.15

[56] References Cited

U.S. PATENT DOCUMENTS

| | | | |
|---|---|---|---|
| 290,851 | 12/1883 | Calner | 126/438 |
| 1,599,481 | 9/1926 | Marcuse | 126/438 |
| 1,661,473 | 3/1928 | Goddard et al. | 126/438 |
| 1,951,403 | 3/1934 | Goddard | 126/440 |
| 4,010,732 | 3/1977 | Sawata et al. | 60/641 |
| 4,043,315 | 8/1977 | Cooper | 126/440 |
| 4,056,093 | 11/1977 | Barger | 126/440 |
| 4,081,024 | 3/1978 | Rush et al. | 126/436 X |
| 4,083,490 | 4/1978 | Cunningham et al. | 126/419 |
| 4,106,479 | 8/1978 | Rogers | 126/439 |

FOREIGN PATENT DOCUMENTS 472427  12/1950  Italy .................................. 126/438

Primary Examiner—Larry Jones
Attorney, Agent, or Firm—Dority & Flint

[57] ABSTRACT

A method and apparatus for collecting, intensifying and storing solar energy which includes a hollow spherical vessel 10 having a polished reflective interior surface. A window 32 is provided in the wall of the vessel for allowing concentrated rays from the sun to enter into the interior of the vessel and be absorbed by a solar collector 20. The collector includes a substantially black (or a selective coating) heat absorbing surface carried by a spherical member 16 which is centrally located within the spherical vessel. Heat absorbing media 18 such as metal shots are carried within the spherical member and change from a solid state to a liquid state as it absorbs the solar energy. The heat absorbing media 18 cause radiant energy to be radiated radially in a symmetric beam pattern to the reflective vessel wall where the radiation is reflected back to the spherical member 16. The reflected radiant energy, in conjunction with the sun's rays, intensify the temperature of the heat absorbing media, producing a thermal power supply.

7 Claims, 5 Drawing Figures

APPARATUS FOR COLLECTING, INTENSIFYING AND STORING SOLAR ENERGY

This is a continuation-in-part application of copending U.S. patent application, Ser. No. 06/057,733 entitled "Method and Apparatus for Collecting, Intensifying and Storing Solar Energy" filed in the United States Patent and Trademark Office on July 16, 1979, now U.S. Pat. No. 4,280,482.

BACKGROUND OF THE INVENTION

The present invention relates to a method and apparatus for storing solar energy and, more particularly, to a method and apparatus for collecting, intensifying, and storing solar energy for subsequent use. Heretofore, energy as a source of power has normally been collected by solar collector panels mounted on structures in open space through which fluid such as air or liquid passes for transferring the collected thermal heat to a storage chamber for subsequent use. These storage beds may take many different configurations, and one particular configuration utilized are rock beds that are positioned below the building. One problem with rock beds is that they are not a very efficient means of storing high temperatures. While these storage chambers heretofore utilized may be satisfactory for heating buildings and the like, they would not be satisfactory for operating power plants.

In U.S. Pat. No. 4,056,093, there is disclosed a solar heating unit which includes a double wall boiler having a pair of spaced inner and outer hemispherical walls defining a closed chamber therebetween in which liquid that is to be heated is carried. Solar energy passes through a lens system for heating the liquid.

In U.S. Pat. No. 4,043,315, there is disclosed an omnidirectional solar heater collector having a transparent, spherical outer shell. A spherical inner shell is carried within the outer shell and contains a plurality of light magnifying lens spaced along the periphery thereof. A plurality of heat collecting elements is carried within the inner shell spaced from the magnifying lens so that maximum light and heat intensity focuses upon these elements.

In U.S. Pat. Nos. 1,169,839, 1,661,473, and 1,599,481, there are disclosed other solar heaters and accumulators in which a liquid is heated by the rays of the sun utilizing lens systems and reflecting mirrors.

One problem with the majority of the solar heaters heretofore utilized is that they do not generate and store temperatures of sufficient intensity for operation of power plants and the like during periods of time of darkness or during inclement weather when clouds and the like reduce the solar rays received by the collector.

SUMMARY OF THE INVENTION

A method and apparatus for collecting, intensifying, and storing thermal energy which includes a hollow spherical vessel having an interior wall. A window is provided in the wall of the vessel for allowing concentrated rays from the sun to enter into the interior of the vessel. A spherical container is centrally located within the vessel and has a solar collector carried thereon. The solar collector, in one particular embodiment, is conically shaped and has a substantially black (or selective coating) surface thereon for receiving and absorbing the rays passing through the window of the spherical vessel. Heat absorbing means, in one particular embodiment, in the form of metal shots is carried in the spherical container for absorbing and storing the thermal energy collected by the solar collector causing radiant energy to be emitted from the spherical container. A polished reflective surface is carried on the interior wall of the spherical vessel for reflecting the radiant energy back to the spherical container intensifying the temperature of the heat absorbing means.

Normally, the heat absorbing means begins in a solid state; and as the intensity of the temperature supplied by the rays from the sun and the reflected radiant energy increases, it is changed from a solid to a liquid state. As a result of the radiant energy being reflected back and forth between the exterior wall of the spherical container and the interior wall of the vessel, the spherical container with the heat absorbing means therein is raised to very high temperatures. Transfer tubes are carried within the spherical container through which a heat transferring fluid passes for removing heat from the molten heat absorbing means for use as a source of thermal power. A vacuum is provided in the space between the external wall of the spherical vessel. A vacuum is also provided in the interior of the spherical container.

In another embodiment, heat is removed from the molten heat absorbing means by selectively opening a door for allowing radiant energy to pass therethrough and strike a radiant exchanger.

Accordingly, it is an important object of the present invention to provide a method and apparatus of producing a high intensity source of thermal power from solar energy.

Another important object of the present invention is to provide an apparatus for collecting, intensifying, and storing solar energy which is clean and extremely simple in operation.

Still another important object of the present invention is to provide a power source which utilizes solar energy in combination with reflected radiant energy to produce a high intensity thermal supply.

These and other objects and advantages of the invention will be come apparent upon reference to the following specification, attendant claims and drawings.

DESCRIPTION OF A PREFERRED EMBODIMENT

Figure 1:
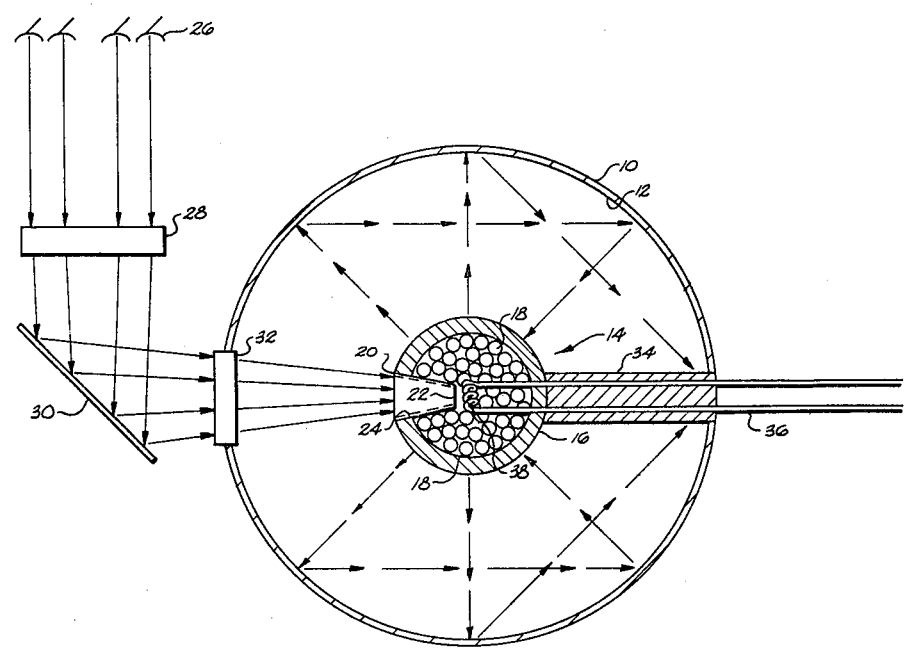
FIG. 1 is a sectional view of a solar power source constructed in accordance with the present invention.
Figure 2:
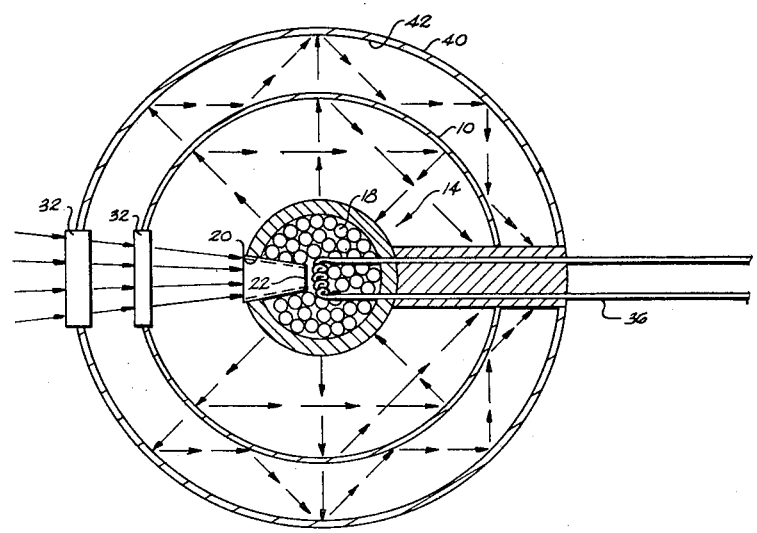
FIG. 2 is a sectional view of a modified form of the invention.

Referring in more detail to the drawings, there is illustrated in FIG. 1 a solar power cell constructed in accordance with the present invention which includes a hollow spherical vessel 10 constructed of any suitable material such as stainless steel that has a reflective polished coating 12 provided on an interior wall thereof.

This coating can be any suitable highly reflective surface such as polished stainless steel or a mirror surface.

Carried within the spherical vessel 10 is a solar collector generally designated by the reference character 14, that will be referred to hereinafter as an emitter. The emitter includes a spherical member 16 that is filled with heat absorbing material 18. Adjacent one side of the spherical member 16 and extending into the interior thereof is a conical-shaped member 20 (or other desirable geometric shape) that has a closed bottom 22 adjacent the large diameter end thereof. The interior wall 24 of the conical-shaped member is coated with a substantially black (or selective surface) heat absorbing surface 24 which is provided for receiving and absorbing thermal energy.

The rays from the sun are directed by converging mirrors 26 through an iris assembly 28 which can be opened and closed for controlling the flow of rays therethrough. A secondary mirror 30 reflects the concentrated rays of sunlight through an optical window 32 provided in the wall 10 of the spherical vessel. As the rays enter into the spherical vessel 10, they strike the black solar collecting surface 24 carried on the interior of the conical-shaped member which absorbs the thermal energy therefrom. This thermal energy is then transferred by means of conduction to the heat absorbing material 18 carried within the spherical container 16. The heat absorbing material may be in the form of metal shots which would become molten when the system is operational. Material such as aluminum, copper, brass, bronze, and other suitable metals would provide good stability, be non-stratifying, and possess good latent heat content characteristics.

The spherical container 16 has a low emissivity value and is placed in or near the center of the interior of the spherical vessel, and it is supported on a post 34. This post assembly 34 has passages extending therethrough through which tubes 36 extend from outside of the spherical vessel 10 to the interior of the spherical container 16 providing communication with a coil or other transfer tube configurations 38 that are carried within the container. Fluid flows through the tubes 36 and the transfer tubes 38 for transferring the stored thermal energy collected by the heat absorbing media 18 externally of the spherical vessel 10. The post 34 can be constructed of any suitable material that is a poor conductor of heat so as to minimize the loss of thermal energy from the emitter outside of the spherical vessel. One suitable material is marionite.

In operation, the rays of the sun are focused by the mirror system through the optical window 32 to the substantially black collective surface 24 of the conical member 20. The metallic heat absorbing material 18 absorbs thermal energy from the conical-shaped member 20. As it absorbs the thermal energy, it radiates radiant energy radially outwardly therefrom, as shown by the broken arrows. This radiant energy is reflected back by the mirror surface 12 carried on the interior of the spherical vessel. As a result of the reflected radiant energy and the incoming solar energy passing through the window 32, the two sources of energy work in unison intensifying the temperature of the heat absorbing material 18, producing an intense source of thermal energy. In order to minimize heat losses, a vacuum is provided in the space between the emitter 14 and the interior wall of the spherical vessel 10. The interior of the emitter is also evacuated of air.

Any suitable optical system can be utilized for concentrating the rays of sun and focusing them on the collective surface 20. It has been found that parabolic mirrors can be positioned for concentrating the sun's rays and directing them through the iris assembly. The purpose of the iris assembly is to regulate the amount of concentrated rays that are supplied to the interior of the spherical vessel.

The spherical vessel, as previously mentioned, may be constructed of any suitable material such as stainless steel; and as a result of being spherical in shape, there is a high volume to surface ratio which minimizes heat losses to the outside, and it also tends to naturally focus reflective patterns of radiant heat to the center thereof for striking the emitter surface.

There are many suitable surface coatings 12 that can be utilized having satisfactory reflecting properties; and in one particular embodiment, a silver coating is utilized. However, it is to be understood that other coatings such as aluminum, gold, copper, radium, and platinum reflective coatings could also be utilized. Silicon monoxide coated over the silver will protect the reflective surface from the severe thermal environment encountered within the spherical vessel 10. To minimize heat losses, the exterior of the vessel is polished or coated producing a reflective surface.

In one particular embodiment, the coating on the interior of the conical member 20 is a carbon, however, other suitable low emissivity-type material such as pyrolytic graphite can be utilized for absorbing thermal energy. The fluid heat transfer media that flows through the tubes 36 and the coil 38 may also be any suitable material such as Dowtherm, Therminol, liquid sodium, carbon dioxide, high pressure water, etc.

In order to increase the efficiency of storing thermal energy in the solar cell, the spherical vessel 10 can be concentrically located within another spherical vessel 40. The interior wall 42 of the spherical vessel 40 has a reflective coating similar to the reflective coating 12 provided on the interior wall of the spherical vessel 10 for reflecting the radiant energy back towards the emitter 14 as shown by the broken lines and arrows. A vacuum is also provided between the external surface of the vessel 10 and the interior surface of the spherical vessel 40. Like reference numberals are used for the same and similar elements. Multiple spherical vessels may also be utilized.

Figure 4:
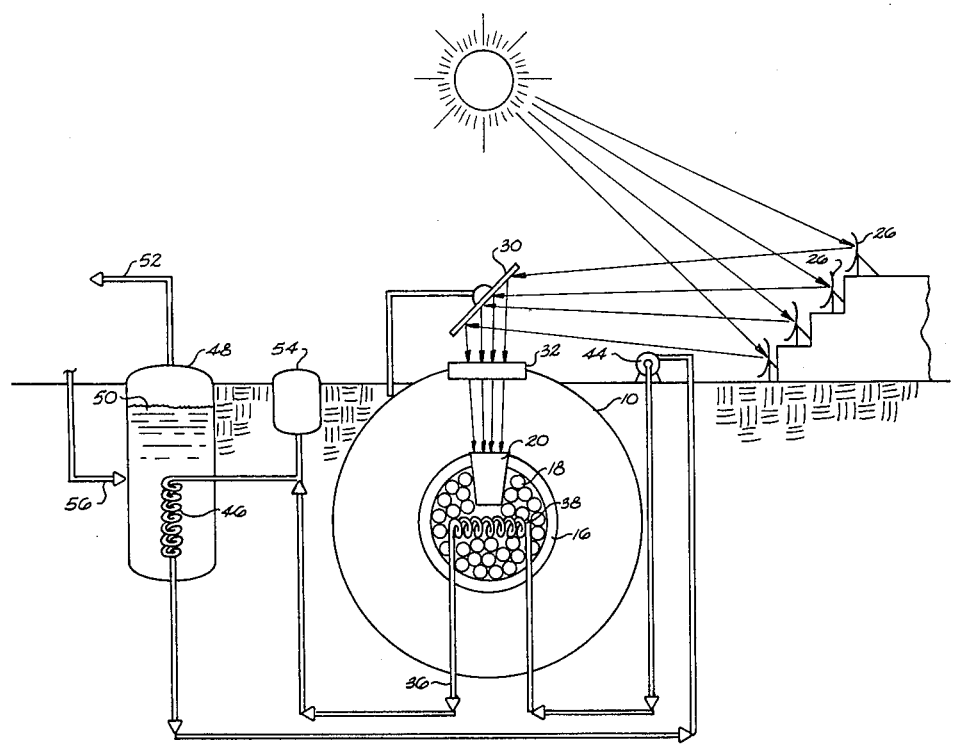
FIG. 4 is a schematic illustration showing a solar cell constructed in accordance with the present invention being utilized in an industrial application such as a major power generation plant.

In FIG. 4, the solar cell is illustrated as being utilized for heating water or generating steam in a tank for home consumption and industrial use. The solar cell can be relatively small when being used for heating water.

The heat transfer media is pumped through the tubes 36 by means of a pump 44. As the fluid passes through the coils 38, it absorbs thermal energy from the molten metal 18 and is conveyed through tubes to a coil 46 provided in a steam generating tank 48. As the heat transfer media is fed through the coil 46, it causes water 50 carried therein to boil to generate steam that is exhausted out pipe 52. The heat transfer media is carried within a closed tubular system extending between the pump 44 and the tank 48. A reservoir 54 is provided for supplying the heat transfer media to the tubes 36. Makeup water is supplied through tube 56 to the steam generating tank 48.

Figure 3:
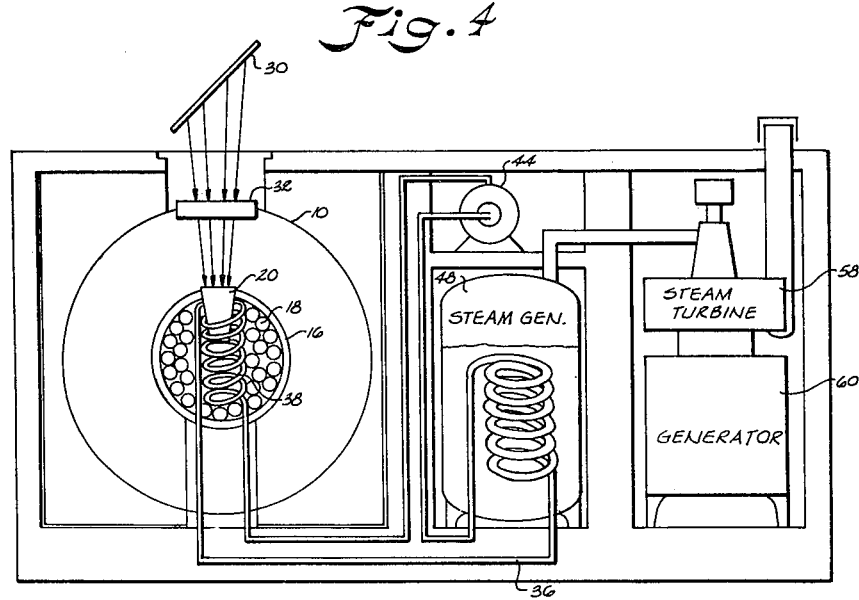
FIG. 3 is a schematic illustration showing a solar cell constructed in accordance with the present invention being utilized for heating hot water and/or steam for residential or industrial use.

In FIG. 4, the solar cell is shown in an industrial application wherein the heat transfer media is fed through the tubes 36 to a steam generating tank 48. The output of the steam generating tank is, in turn, fed directly to a steam turbine 58 which drives a generator 60 for generating electrical power. Of course, it is to be understood that the solar cell could be utilized in many different industrial applications, and the application shown in FIGS. 3 and 4 are examples of such use. The entire assembly, such as illustrated in FIG. 4, can be located underground so as to minimize thermal losses, or it can be carried within a concrete housing as illustrated in FIG. 3.

Energy can be removed from the molten metal 18 in other forms than thermal. For example, a thermocouple or thermonic generator can convert thermal energy to electrical energy for removal.

Figure 5:
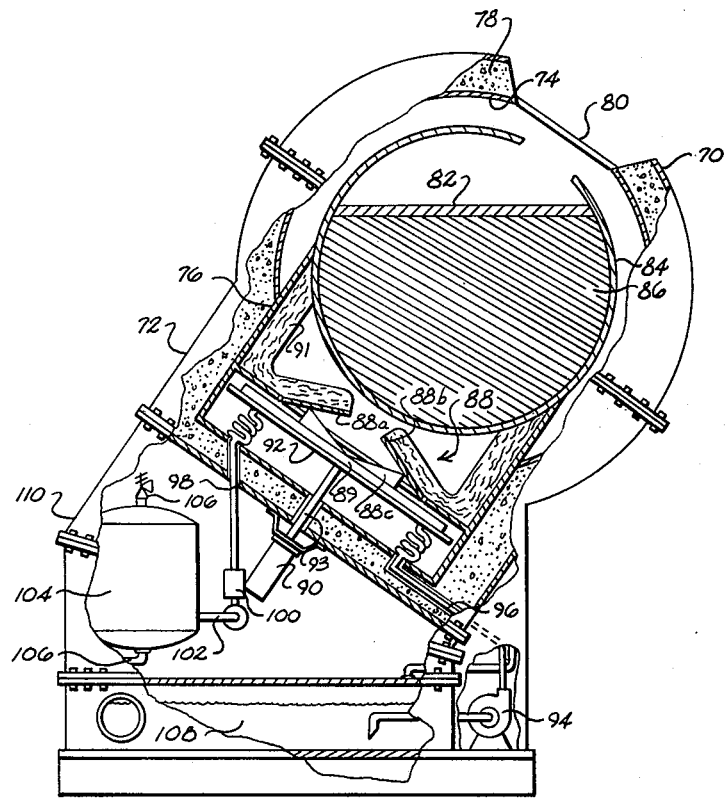
FIG. 5 is a sectional view of a modified form of the invention.

Referring in more detail to FIG. 5 of the drawings, there is illustrated a modified form of the invention. The thermal storage apparatus includes an outer housing 70 which has a spherical upper portion. An opening is provided adjacent the top of the housing through which thermal energy is directed by any suitable means such as disclosed in FIG. 1. The outer shell 70 may be constructed of any suitable material such as carbon steel. The bottom portion of the outer shell terminates into a cylindrical housing 72.

Positioned and spaced from the outer shell 70 is an intermediate shell 74 wich is also spherical in shape, except adjacent the bottom thereof which terminates in a cylindrical housing 76.

Positioned between the outer shell 70 and the inner shell 74 is diatomaceous earth 78 which has a K factor of 0.015.

An opening is provided in the upper surface of the intermediate shell in which a quartz window 80 is positioned for allowing the thermal rays to project therethrough and impinge upon a collector 82 carried within a spherical emitter 84. A vacuum is provided in the space between the emitter 84 and the intermediate shell 74, and it also extends into the upper portion of the emitter.

A metallic phase change medium 86 is carried within the emitter 84, and it can be any suitable material such as aluminum which goes from a solid state to a liquid state as it absorbs thermal energy from the collector 82 that floats on top thereof. The collector 82 is a fluid carbon black surface.

The outer surface of the emitter is a polished steel surface, and the inner surface of the intermediate layer 74 is also a polished surface. In one particular embodiment, mirror surfaces are provided instead of the polished reflective surfaces.

Positioned in the cylinder 76 below the spherical emitter 84 is a means for controlling the transfer of radiant energy from the emitter generally designated by the reference character 88.

The means 88 includes a pair of hinged doors 88a and 88b which are selectively opened and closed by means of camming surfaces 88c that are, in turn, supported on top of a radiant exchanger 89 that is circular in shape and rests on a support plate 92. The radiant exchanger 89 is hollow so that any suitable fluid can be pumped therethrough for transferring heat being absorbed thereby. The upper surface of the radiant exchanger is a black heat absorbing surface. Insulation 91 of any suitable type is carried on top of the rectangular shaped hinged doors 88a and 88b for preventing the transfer of radiant energy from the emitter 84 when the doors are closed. The support plate 92 is, in turn, supported on a piston rod 93 that extends out of a hydraulically or pneumatically operated cylinder 90. The cylinder 90 is a double-acting cylinder so that when pressurized fluid is fed into the bottom thereof, it forces the piston rod 93 upward causing the camming member 88c to engage the bottom of the doors 88a and 88b opening the doors to permit radiant energy to pass therethrough. It can be seen that as the piston rod 93 is raised, the radiant exchanger 89 is moved vertically upwardly closer to the emitter 84.

Fluid such as water is pumped under pressure by means of a pump 94 through an inlet pipe 96. The fluid is pressurized by the pump 94 to a pressure of 60 p.s.i. The fluid exits from the radiant exchanger 89 through a pipe 98 and flows through a steam flow control valve 100. As the fluid passes through the radiant exchanger, it is heated from approximately 60° F. up to 250° F. This pressurized water then passes through the valve 100 and flashes into steam in the pipe 102. As it flashes into steam, it drops to a pressure of approximately 15 p.s.i. The steam then is fed through any suitable receiver such as a steam drum 104 and is fed out of the top through valves 106 to any suitable device for utilizing the steam. Any condensation collecting in the steam drum 104 is drained out the bottom through pipe 106 and is either fed back to a water reservoir 108 provided adjacent the bottom of the structure or discharged.

The entire structure, as shown in FIG. 5, is positioned at the particular latitude angle for the area where it is located for maximizing the reception of rays from the sun. In the particular embodiment illustrated, it is held in the position shown by a steel structure 110 that is bolted together and secured to the outer shell 70.

If it is desired to use a metallic phase change medium in the emitter so as to create temperatures above approximately 1,000° F., then instead of providing a vacuum between the emitter shell 84 and the intermediate shell 74, glass beads or aluminum foil flakes are positioned between the two shells to produce a temperature gradient drop to prevent damage to the reflective surfaces provided on the inner wall of the intermediate shell 74 and the outer wall of the emitter 84.

In operation, rays from the sun are directed in a concentrated form by any suitable means through the window 80 so that they strike on the collector 82. As the collector 82 absorbs the thermal energy, it causes the metallic phase change medium to go from a solid state to a liquid state. Since the carbon black collector 82 floats on the metallic phase change medium 86, it continues to cover the entire upper surface of the metallic phase change medium 86 as the phase change medium expands and contracts.

After the phase change medium 86 has stored sufficient thermal energy, the emitter 84 begins to glow similar to a radiant heater. The amount of radiant energy removed from the emitter 84 is controlled by manipulating the doors 88a and 88b. When the doors are open, radiant energy passes through the openings provided therein, heating the fluid or water flowing through the radiant exchanger 89. This causes the pressurized water to be heated. As previously mentioned, the heated water then is passed through a valve 100 and flashes to steam in the pipe 102 for subsequent use as a source of energy.

While a preferred embodiment of the invention has been described using specific terms, such description is for illustrative purposes only, and it is to be understood that changes and variations may be made without departing from the spirit or scope of the following claims.

What is claimed is:

1. An apparatus for collecting, intensifying or sustaining, and storing solar energy comprising:
   a hollow vessel having an interior wall;
   a window provided in said wall of said vessel for allowing concentrated rays from the sun to enter into the interior of said vessel;
   a solar collector carried adjacent the center of said vessel spaced from the interior walls of said vessel, said solar collector including;
   (i) a container,
   (ii) a substantially black fluid heat absorbing surface positioned for being contacted by said rays passing through said window,
   (iii) heat absorbing means carried in said container supporting said substantially black fluid heat absorbing surface for absorbing and storing thermal energy from said heat absorbing surface and for heating said container causing radiant energy to be emitted from said container, and
   (iv) said heat absorbing means being metal that goes from a solid state to a liquid state upon absorbing thermal energy from said substantially black heat absorbing surface, and
   a polished reflective surface carried on an interior wall of said vessel for reflecting radiant energy back to said container intensifying the temperature of said heat absorbing means.

2. The apparatus as set forth in claim 1 further comprising:
   a radiant exchanger spaced from said container, means positioned between said radiant exchanger and said container for controlling the transfer of radiant energy from said container to said radiant exchanger.

3. The apparatus as set forth in claim 2 further comprising:
   a housing wall being spaced from and enclosing said hollow vessel, and
   thermal insulation carried between said housing wall and said vessel providing an insulating layer.

4. The apparatus as set forth in claim 3 further comprising:
   said layer of thermal insulation being diatomaceous earth.

5. The apparatus as set forth in claim 2 further comprising:
   said means for controlling the transfer of radiant energy from said container to said radiant exchanger including an adjustable door.

6. The apparatus as set forth in claim 5 further comprising:
   said adjustable door including,
   (i) a plurality of hinged doors; and
   (ii) means for selectively opening and closing said doors.

7. The apparatus as set forth in claim 6 further comprising:
   means for moving said radiant exchanger closer to said container as said doors are opened.

* * * * *